US011850606B2

(12) United States Patent
Tung et al.

(10) Patent No.: US 11,850,606 B2
(45) Date of Patent: Dec. 26, 2023

(54) PARTICLES CAPTURING SYSTEM

(71) Applicant: Industrial Technology Research Institute, Hsin-Chu (TW)

(72) Inventors: Fu-Ching Tung, Hsinchu (TW); Hsuan-Fu Wang, Taoyuan (TW); Jwu-Sheng Hu, Hsinchu County (TW); Yung-Jen Cheng, Hsinchu (TW); Hung-Cheng Yen, Kaohsiung (TW); Meng-Chun Chen, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 363 days.

(21) Appl. No.: 17/106,222

(22) Filed: Nov. 30, 2020

(65) Prior Publication Data

US 2022/0071461 A1  Mar. 10, 2022

Related U.S. Application Data

(60) Provisional application No. 63/075,845, filed on Sep. 9, 2020.

(30) Foreign Application Priority Data

Oct. 21, 2020   (TW) .................... 109136467

(51) Int. Cl.
*B04C 5/26* (2006.01)
*B04C 9/00* (2006.01)
*B01D 47/10* (2006.01)

(52) U.S. Cl.
CPC ............... *B04C 9/00* (2013.01); *B01D 47/10* (2013.01); *B04C 5/26* (2013.01); *B04C 2009/008* (2013.01)

(58) Field of Classification Search
CPC ....... B04C 9/00; B04C 5/26; B04C 2009/008; B04C 5/28; B01D 47/10; B01D 45/12; B01D 47/06; B01D 50/40; Y02A 50/2351
See application file for complete search history.

(56) References Cited

U.S. PATENT DOCUMENTS 3,358,413 A   12/1967  Kalika
3,818,681 A    6/1974  Loquenz et al.
(Continued)

FOREIGN PATENT DOCUMENTS

CN    101416849 A    4/2009
CN    202568087 U   12/2012
(Continued)

OTHER PUBLICATIONS

Akharifar et al. "Improving cyclone efficiency for small particles", pp. 483-492, 2019, Elsvier.
(Continued)

*Primary Examiner* — Dung H Bui
(74) *Attorney, Agent, or Firm* — WPAT, P.C.

(57) ABSTRACT

A particles capturing system includes a venturi filter device, a cyclone filter device, a plurality of first nozzles and air to flow through the system. The venturi filter device has an air intake portion, a neck portion and an air outlet portion. The cyclone filter device, disposed in the air outlet portion, has an entrance and an exit. The plurality of first nozzles, disposed inside the venturi filter device, have a height greater than that of the the neck portion. When the air flows, the air enters the venturi filter device via an air inlet of the air intake portion, then orderly passes through the neck portion and the plurality of first nozzles, then enters the cyclone filter device via the entrance, and finally leaves the cyclone filter device via the exit, such that particles in the flowing air can be captured.

23 Claims, 9 Drawing Sheets

(56) References Cited

U.S. PATENT DOCUMENTS

| | | | | |
|---|---|---|---|---|
| 3,885,933 | A | * | 5/1975 | Putney .................... B04C 5/103 55/459.1 |
| 4,026,682 | A | * | 5/1977 | Pausch ................... B01D 47/10 261/118 |
| 4,141,701 | A | | 2/1979 | Ewan et al. |
| 4,145,193 | A | * | 3/1979 | Hegemann ............. B01D 47/06 96/261 |
| 4,167,401 | A | * | 9/1979 | Melnyk .................. B01D 47/10 96/264 |
| 4,328,008 | A | * | 5/1982 | Muenger ................. C10K 1/04 252/373 |
| 4,375,976 | A | * | 3/1983 | Potter .................... B01D 50/10 95/200 |
| 5,279,646 | A | * | 1/1994 | Schwab ................. B01D 47/10 95/203 |
| 5,336,284 | A | * | 8/1994 | Schifftner ............. B01D 47/10 261/DIG. 54 |
| 5,484,471 | A | * | 1/1996 | Schwab ................. B01D 47/10 95/200 |
| 6,080,217 | A | * | 6/2000 | Gobl ........................ B04C 5/28 55/385.2 |
| 6,090,180 | A | * | 7/2000 | Peting .................... B01D 45/08 75/375 |
| 6,200,361 | B1 | | 3/2001 | Krymsky |
| 6,719,829 | B1 | | 4/2004 | Schwab |
| 10,369,506 | B1 | * | 8/2019 | Hakki .................. B01D 53/504 |
| 10,987,621 | B1 | * | 4/2021 | Lee ........................ B01D 53/79 |
| 2005/0022667 | A1 | * | 2/2005 | Schwab ................. B01D 47/10 96/275 |
| 2005/0076782 | A1 | * | 4/2005 | Weinbren ............... B01D 47/10 96/306 |
| 2009/0183632 | A1 | * | 7/2009 | Peltonen ................ B01D 47/10 95/151 |
| 2013/0239810 | A1 | * | 9/2013 | Yang ...................... B01D 53/14 95/196 |
| 2014/0182454 | A1 | * | 7/2014 | Nieuwoudt ............ B01D 45/12 95/268 |
| 2014/0216264 | A1 | * | 8/2014 | Hsiau ..................... B01D 50/20 96/373 |
| 2014/0345466 | A1 | * | 11/2014 | Fischer .................. B01D 47/06 96/280 |
| 2015/0165364 | A1 | * | 6/2015 | Ollila ..................... B01D 47/10 96/306 |
| 2015/0190744 | A1 | * | 7/2015 | Grave .................... B01D 47/14 95/219 |
| 2016/0001214 | A1 | * | 1/2016 | Chen ...................... B01D 53/14 96/240 |
| 2016/0137431 | A1 | | 5/2016 | Bizhanzadeh |
| 2016/0243487 | A1 | * | 8/2016 | Kim ........................ A23F 5/04 |
| 2016/0332113 | A1 | * | 11/2016 | Jenkins ................. B01D 47/10 |
| 2018/0126389 | A1 | * | 5/2018 | Lefsrud .................. B01D 45/16 |
| 2019/0151766 | A1 | * | 5/2019 | Salazar .................. B01D 45/12 |
| 2019/0336904 | A1 | | 11/2019 | Choi et al. |
| 2020/0206672 | A1 | | 7/2020 | Vallejo |
| 2022/0032226 | A1 | * | 2/2022 | Tubergen ................ B04C 5/185 |
| 2022/0274044 | A1 | * | 9/2022 | Price ..................... F04D 29/706 |

FOREIGN PATENT DOCUMENTS

| | | |
|---|---|---|
| CN | 202626221 U | 12/2012 |
| CN | 202700306 U | 1/2013 |
| CN | 203305069 U | 11/2013 |
| CN | 104069701 A | 10/2014 |
| CN | 102961943 B | 3/2015 |
| CN | 104888983 A | 9/2015 |
| CN | 205287953 U | 6/2016 |
| CN | 104645768 B | 8/2016 |
| CN | 106925039 A | 7/2017 |
| CN | 206350978 U | 7/2017 |
| CN | 107469529 A | 12/2017 |
| CN | 108404565 A | 8/2018 |
| CN | 108619794 A | 10/2018 |
| CN | 108837604 A | 11/2018 |
| CN | 201341850 Y | 11/2018 |
| CN | 109833707 A | 6/2019 |
| CN | 209917597 U | 1/2020 |
| CN | 110813002 A | 2/2020 |
| EP | 3135171 A1 | 3/2017 |
| JP | H0852383 A | 2/1996 |
| JP | H10230223 A | 9/1998 |
| JP | H11179241 A | 7/1999 |
| JP | 2002177724 A | 6/2002 |
| JP | 2013248578 A | 12/2013 |
| JP | 2019130437 A | 8/2019 |
| JP | 6718566 B1 | 7/2020 |
| KR | 101953743 B1 | 3/2019 |
| RU | 2413571 C1 | 3/2011 |
| RU | 2019105976 A | 9/2020 |
| TW | 247455 | 5/1995 |
| TW | 352007 | 2/1999 |
| TW | 482017 | 4/2002 |
| TW | I230632 B | 4/2005 |
| TW | M340852 | 9/2008 |
| TW | 201927387 | 7/2019 |
| TW | M609892 | 4/2021 |
| WO | WO2010115571 A1 | 10/2010 |
| WO | WO2014058773 A1 | 4/2014 |
| WO | WO2020/006439 A1 | 1/2020 |

OTHER PUBLICATIONS

Zhou et al. "Flue gas desulfurization research in liquid jet-absorption coupled gas cyclone-separation device", pp. 4053-4058, 2016, Chemical Industry and Engineering Progress.

Chen "A Three-stage cyclone separator", pp. 7-8, 1984, Hubei Industrial Architecture Design Institute.

Zhou et al. "Characteristic of Separation and Numerical Simulation of Finest Particles in Cyclone Separator", pp. 45-47, 2007, Coal Mine Machinery.

Chinese Office Action dated Dec. 13, 2022, China Patent Office, China.

Technical evaluation report for utility model patent issued on Nov. 29, 2021, Taiwan.

TW OA dated Dec. 28, 2021.

Lebel et al. "Concept for a cyclonic spray scrubber as a fission product removal system for filtered containment venting", Nuclear Engineering and Design, http://dx.doi.org/10.1016/j.nucengdes.2015.11.036, 2015 Elsevier B.V.

Darmawan et al. "Hydrodynamic Simulation of Cyclone Separators" Computational Fluid Dynamics, ISBN 978-953-7619-59-6, pp. 420, Jan. 2010, INTECH, Croatia, downloaded from sciyo.com.

Achiles et al. "Performance of a cyclone scrubber on removal of fine particulate matter", Article in Chemical Industry and Chemical Engineering Quarterly—Jan. 2019.

Zhang et al. "Acoustic Agglomeration of coal-fired fly ash particles in low frequency sound fields" Sep. 5, 2008, The National Natural Science Foundation of China and the Program for New Century Excellent Talents University.

* cited by examiner

PARTICLES CAPTURING SYSTEM

CROSS REFERENCE TO RELATED APPLICATION

This application claims the benefits of U.S. provisional application No. 63/075,845, filed Sep. 9, 2020, and Taiwan application Serial No. 109136467, filed Oct. 21, 2020, the disclosures of which are incorporated by references herein in its entirety.

TECHNICAL FIELD

The present disclosure relates in general to a particle processing technology, and more particularly to a technique for capturing particles, fine particles, dusts and so on.

BACKGROUND

Among sources of air pollution, particles and dusts are two of many crucial elements. Due to incredible micro volumes, health risk from air pollution would mainly resulted from the particles and dusts in the air, especially to diseases of the respiratory system.

To conventional dust or particles treatment systems upon exhaust gas of the high-tech manufacturing, a step of collecting dusts or particles is common in many exhaust gas reduction processes. Dusts in exhaust gas would be suspended in the air for a long time in a form of solid-state particles. The dust having an aerodynamic diameter larger than 10 micrometers would be classified as a coarse particulate matter. Such a coarse particle or particulate matter (PM) would be absorbed or contaminated by nose hair or mucous membrane in nasopharyngeal cavity. On the other hand, the dust having an aerodynamic diameter less than 10 micrometers (PM10) is classified as a suspended particulate matter, which would go deeply into the lungs along the trachea and bronchus while being inhaled.

Also, the dust having an aerodynamic diameter less than 2.5 micrometers is classified as a fine suspended particulate matter (PM2.5), and that less than 0.1 micrometers is classified as a super fine suspended particulate matter. In the art, almost all the existing gas scrubbers and separators are cumbersome to handle the particles including PM10 and PM2.5, by which exhaust ducts are usually blocked.

In lots of processing processes, various particles and dusts would be generated and usually discharged into the atmosphere without any treatment. However, for many good reasons, such particles and dusts must be removed from the exhaust air or gas before being discharged, so that air pollution therefrom might be reduced to a minimum.

By having the exhaust gas produced by a semiconductor process as an example, though majority of chemical substances and particles can be removed after the exhaust gas is led to pass through a scrubber, yet small particles (<PM10) are still hard to be effectively removed. Or, if the exhaust gas carrying these particulate matters is discharged directly into the atmosphere, then air pollution and environmental hazards might be inevitable.

Accordingly, an issue of developing a particles capturing system that can collect or capture effectively particles and dusts is definitely urgent in the art.

SUMMARY

In one embodiment of this disclosure, a particles capturing system includes a venturi filter device, a cyclone filter device, and a plurality of first nozzles.

The venturi filter device has an air intake portion, a neck portion and an air outlet portion. The height of the air outlet portion is greater than the height of the air intake portion. The neck portion is disposed between the air intake portion and the air outlet portion. The inner diameter of the neck portion is smaller than the inner diameter of any of the air intake portion and the air outlet portion. The venturi filter device is defined with a center axis.

The cyclone filter device, disposed along the center axis in the air outlet portion, has a plurality of filter units. Each of the plurality of filter units includes a straight-pipe portion and a taper-pipe portion connected with a bottom of the straight-pipe portion. The straight-pipe portion has a longitudinal axis perpendicular to a base plane. A narrower end of the taper-pipe portion is close to the neck portion. The straight-pipe portions of the plurality of filter units have at least two sizes, so that the plurality of filter units can be telescoped together. The outmost filter unit of the plurality of filter units includes an entrance having a height greater than the height measured at a bottom of the neighboring innermost filter unit of the plurality of filter units. The straight-pipe portion of the innermost filter unit has an exit located at a top thereof. In addition, the exit has a height greater than the height of the entrance.

The plurality of first nozzles, disposed inside the venturi filter device, have a height greater than another height of the the neck portion. Each of the plurality of first nozzles is to provide a first mist having a spray direction substantially parallel to the center axis of the venturi filter device, and the plurality of first nozzles are to spray toward the neck portion.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
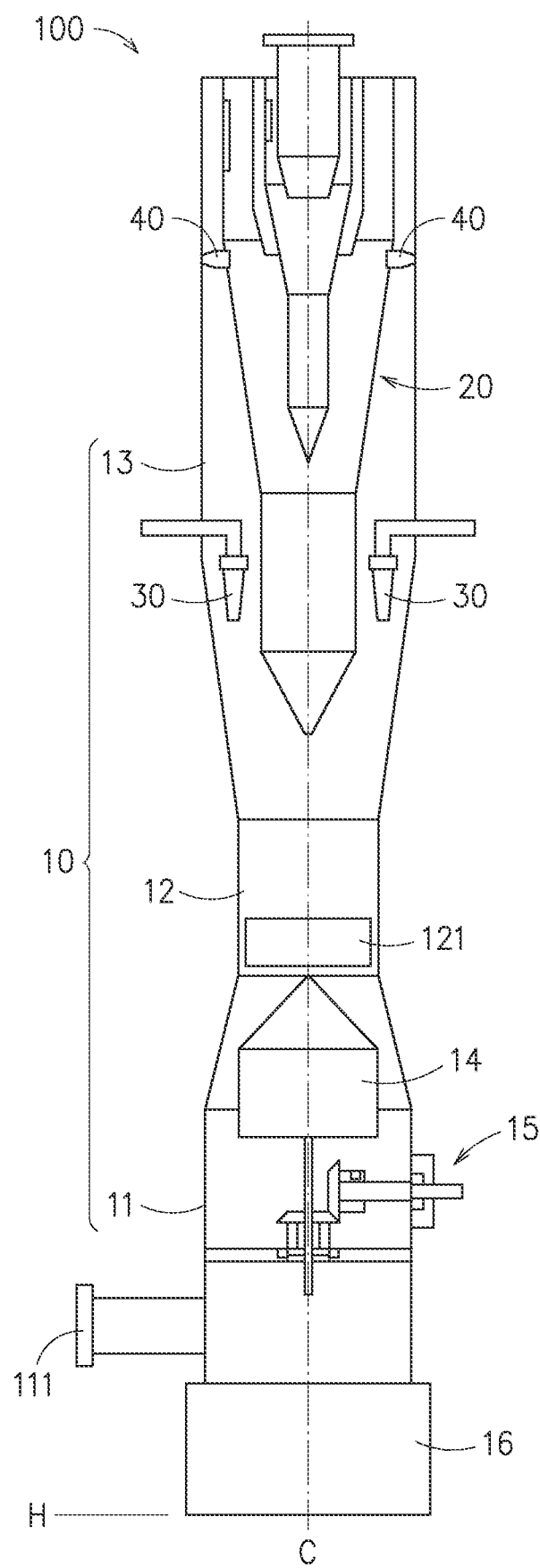
FIG. 1 is a schematic view of an embodiment of the particles capturing system equipped with a venturi filter device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a particles capturing system 100 includes a venturi filter device 10, a cyclone filter device 20, a plurality of first nozzles 30 and a plurality of second nozzles 40. The venturi filter device 10 and the cyclone filter device 20 are disposed to have the same center axis C.

Figure 2A:
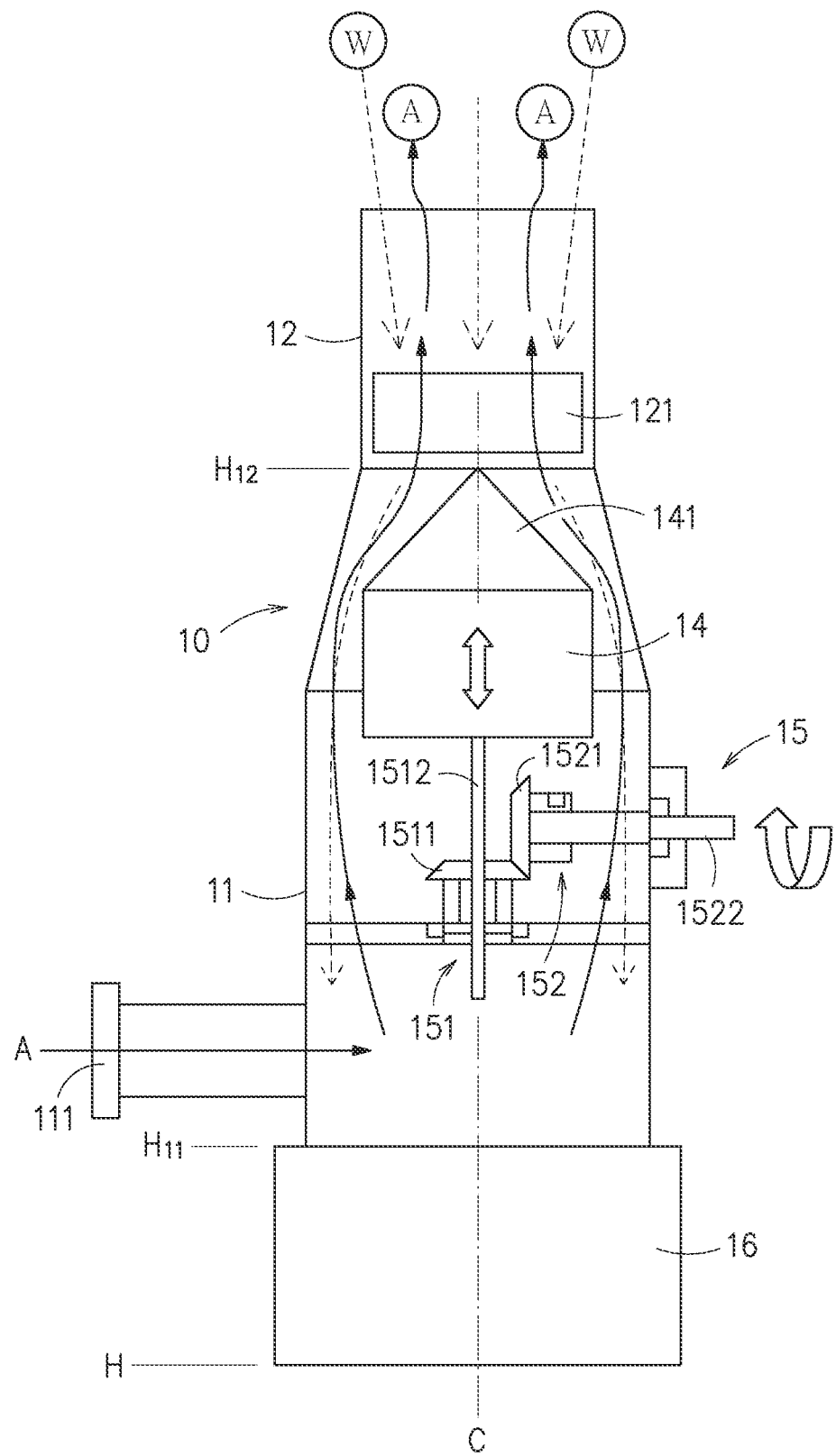
FIG. 2A shows schematically flow directions of intake air and water mist in the air intake portion and the neck portion of FIG. 1.
Figures 2B, 2C:
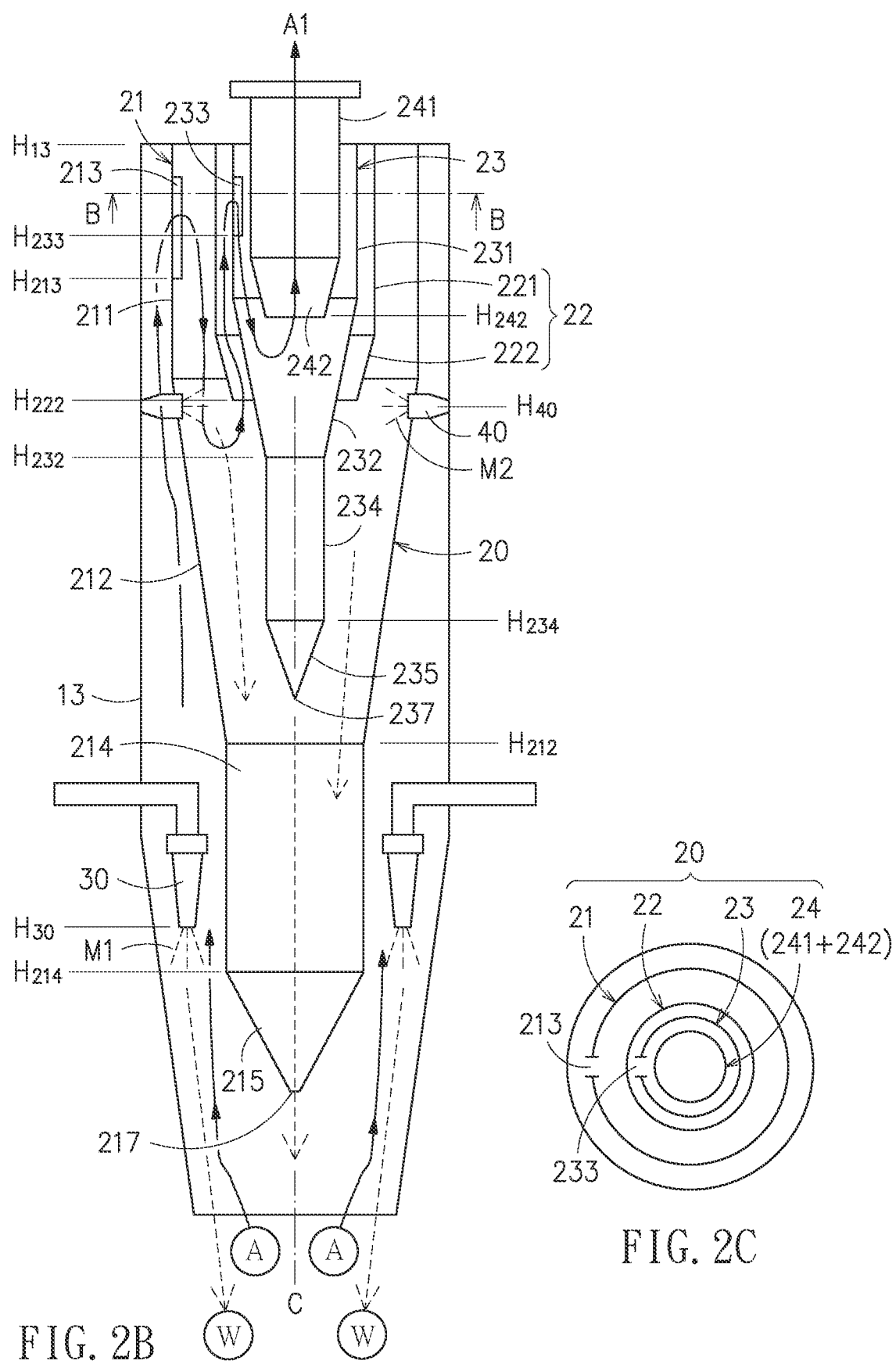
FIG. 2B shows schematically flow directions of intake air and water mist in the air outlet portion of FIG. 1.
FIG. 2C is a schematic cross-sectional view of FIG. 2B along line B-B.

Referring to FIG. 1 and FIGS. 2A, 2B, the venturi filter device 10 has an air intake portion 11, a neck portion 12 and an air outlet portion 13. The air intake portion 11 has an air inlet 111 for allowing air A to enter the air intake portion 11. Generally, the air A contains the polluting particles and dusts.

In order to clearly elucidate structures, and flows of air and water mist of this disclosure, the particles particles capturing system 100 of FIG. 1 is divided into two portions, shown in FIG. 2A and FIG. 2B, respectively. It can be fully aware that portions of FIG. 2A and FIG. 2B are two parts to be connected together for forming the structure of FIG. 1, which can be observed from labeling at the top portion of FIG. 2A and the bottom portion of FIG. 2B. In addition, to clarify longitudinal reference positions at this particles capturing system 100, a plurality of distance symbols Hx's have been introduced to stand for corresponding shortest distances of elements assigned with part numbers "x"s to a common base plane H defined to a lowest plane of the system 100 (see FIG. 2A). For example, a height H11 in FIG. 2A stands for the shortest distance between element 11 and the base plane H. For one more example in FIG. 2B, a height H233 stands for the shortest distance between element 233 and the base plane H.

A height H13 of the air outlet portion 13 (as shown in FIG. 2B) is greater than another height H11 of the air intake portion 11 (as shown in FIG. 2A). The neck portion 12, disposed between the air intake portion 11 and the air outlet portion 13, has an inner diameter less than another inner diameter of the air intake portion 11 or the air outlet portion 13. In this embodiment, the neck portion 12 provides a narrow inner cross section for increasing the air speed of internal turbulent flows, such that the efficiency of capturing particles and dusts can be improved.

As shown in FIG. 2A, the venturi filter device 10 further includes an adjustment member 14 having a taper portion 141. The small end (such as a tip end) of the taper portion 141 is disposed close to the neck portion 12. The adjustment member 14 is vertically movable inside the air intake portion 11, such that the cross-sectional area inside the neck portion 12 allowing the air A from the air intake portion 11 to pass through the neck portion 12 can be adjusted. Namely, the flow speed of the air A from the air intake portion 11 to pass through the neck portion 12 can be adjusted.

In this embodiment, an adjustment gear set 15, connected with the adjustment member 14, includes a first gear assembly 151 and a second gear assembly 152.

The first gear assembly 151 includes a first gear 1511 and a first shaft 1512. Two opposite ends of the first shaft 1512 are connected with the adjustment member 14 and the first gear 1511, and the center axis of the first shaft 1512 is perpendicular to the base plane H.

The second gear assembly 152 includes a second gear 1521 and a second shaft 1522. One end of the second shaft 1522 is connected with the second gear 1521, while another end thereof protrudes out of the venturi filter device 10. The second gear 1521 is meshed with the first gear 1511, so that the second shaft 1522 can be driven to rotate synchronously the second gear 1521 and the first gear 1511. Thereupon, the first shaft 1512 can be driven to move the adjustment member 14 up and down. In one exemplary example, the adjustment member 14 can be a piston or a plunger.

In another embodiment, the adjustment gear set 15 can be omitted. As such, the annular cross section area for allowing the air A to enter the neck portion 12 is a constant.

Referring to FIG. 1, FIG. 2A and FIG. 2B, the first nozzle 30, disposed inside the venturi filter device 10, has a height H30 (see FIG. 2B) greater than another height H12 of the neck portion 12 (see FIG. 2A). Each of the first nozzles 30 is to provide a corresponding first mist M1, and spray directions of individual first mists M1 are substantially parallel to the center axis C of the venturi filter device 10, so that the first nozzles 30 can provide sprays toward the neck portion 12 for washing the particles and dusts down to the collection tank located below.

As shown in FIG. 2B, in this embodiment, the first nozzles 30 can be multiple, and each of the first nozzles 30 has the same height H30. The plurality of the first nozzles 30 are equally spaced to surround the center axis of the venturi filter device 10. In this disclosure, the number of the first nozzles 30 is not specifically defined, at least three for example. Preferably, the first nozzles 30 are arranged along a circle centered at the center axis C in equal angular spacing. For example, if the number of the first nozzles 30 is 3, the angle between two neighboring first nozzles 30 is 120°. In another example, if the number of the first nozzles 30 is 4, the angle between two neighboring first nozzles 30 is 90°.

Referring to FIG. 1 and FIG. 2B, the second nozzles 40 are disposed close to the air outlet portion 13 by surrounding the cyclone filter device 20. The height H40 of the second nozzle 40 is greater than the height H30 of the first nozzle 30. Each of the second nozzles 40 provides a second mist M2 having a spray direction substantially parallel to the base plane H, or perpendicular to the base plane H by providing downward spraying. Also, the second nozzle 40 is to spay the second mist M2 into the cyclone filter device 20.

As shown in FIG. 2B, in this embodiment, the second nozzles 40 can be multiple, and each of the second nozzles 40 has the same height H40. The plurality of the second nozzles 40 are equally spaced to surround the center axis of the cyclone filter device 20. In this disclosure, the number of the second nozzles 40 is not specifically defined, at least three for example. Preferably, the second nozzles 40 are arranged along a circle centered at the center axis C in equal angular spacing. For example, if the number of the second nozzles 40 is 3, the angle between two neighboring second nozzles 40 would be 120°. In another example, if the number of the second nozzles 40 is 4, the angle between two neighboring second nozzles 40 would be 90°.

A collection tank 16, disposed under the air inlet 111, is used for collecting the falling first mist M1 and second mist M2 and then for capturing the particles and dusts in the mists M1, M2.

In the embodiment shown in FIG. 1 and FIG. 2A, the air inlet 111 is disposed laterally to the air intake portion 11, and above the collection tank 16. The air A enters the air intake portion 11 in a manner of being parallel to the base plane H. in some other embodiments, the construction and location of the air inlet 111 can be determined up to practical requirements.

Figure 3:
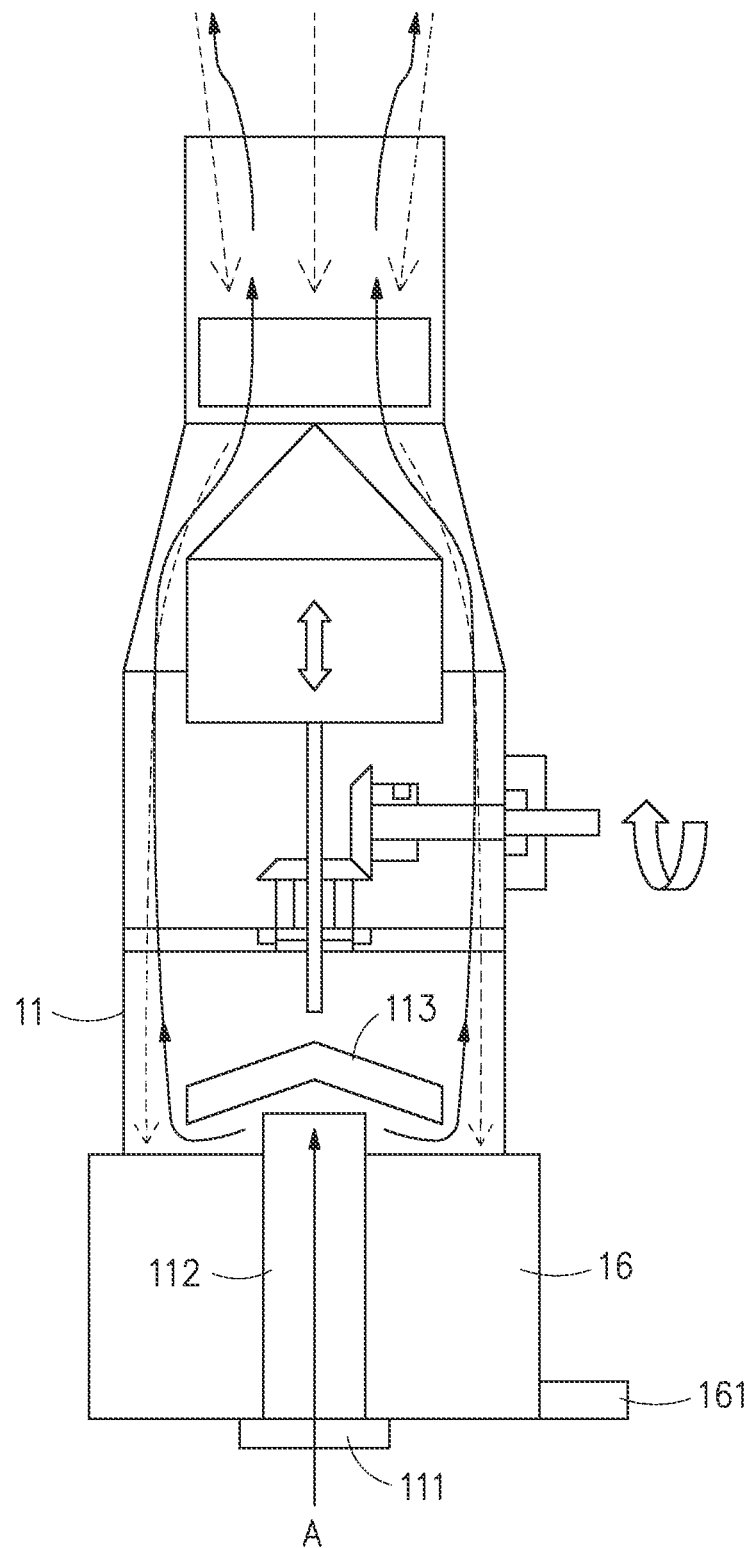
FIG. 3 is a schematic view showing flow directions of intake air and water mist in another embodiment of the venturi filter device in accordance with this disclosure.

Referring to FIG. 3, the air inlet 111 is disposed at the bottom of the air intake portion 11, and connected with an air-inlet extension pipe 112 extending upward. A top end of the air-inlet extension pipe 112 protrudes over the collection tank 16. The air A enters the air intake portion 11 in a manner of being perpendicular to the base plane H. In addition, a pipe-end deflector 113 is provided to a location right above the air-inlet extension pipe 112 by keeping a predetermined gap between the pipe-end deflector 113 and the top end of the air-inlet extension pipe 112. Before entering the air intake portion 11, the air A from the air-inlet extension pipe 112 would be forced to bifurcate and be individually deflected outward by the pipe-end deflector 113.

One side of the collection tank 16 is furnished with a drain pipe 161 for draining the water or liquid collected in the collection tank 16.

Referring to FIG. 1 and FIG. 2A, the neck portion 12 of the venturi filter device 10 is furnished thereinside a porous material 121 or a specific member having a porous structure. The porous material 121 is made of a metal or a polymer that can accumulate microorganisms on the wet material surface, and thus the surface contact for the first mist M1 and the second mist M2 can be enlarged. Thereupon, sewage degradation and separation treatment upon the first mist M1 and the second mist M2 can be performed. In another embodiment, the porous material 121 can be omitted.

Referring to FIG. 1 and FIG. 2B, the cyclone filter device 20, disposed in the air outlet portion 13 of the venturi filter device 10, includes a first filter unit 21, a second filter unit 22, a third filter unit 23 and a fourth filter unit 24.

The first filter unit 21 has a first straight-pipe portion 211 and a first taper-pipe portion 212. The first straight-pipe portion 211 is furnished with a first opening 213 as an entrance of air. The center axis C of the first straight-pipe portion 211 is perpendicular to the base plane H. A first end-drop pipe 214 is provided to connect a bottom of the first taper-pipe portion 212 of the first filter unit 21. The height H214 measured at an axial bottom end of the first end-drop pipe 214 is less than the height H30 of each of the first nozzles 30. A first taper portion 215 is provided to connect a bottom of the first end-drop pipe 214, and a first taper-portion opening 217 located at a narrower end of of the first taper portion 215 is close to the neck portion 12 (see FIG. 1 and FIG. 2A).

The second filter unit 22 has a second straight-pipe portion 221 and a second taper-pipe portion 222. An outer diameter of the second straight-pipe portion 221 is smaller than an inner diameter of the first straight-pipe portion 211. The second filter unit 22 disposed inside the first filter unit 21 keeps the same center axis C as the first straight-pipe portion 211. In addition, the height H222 measured at a bottom of the second taper-pipe portion 222 is less than the height H213 of the first opening 213.

The third filter unit 23 has a third straight-pipe portion 231 and a third taper-pipe portion 232. An outer diameter of the third straight-pipe portion 231 is smaller than an inner diameter of the second straight-pipe portion 221. The third filter unit 23, disposed inside the second filter unit 22, keeps the same center axis C as the second filter unit 22. The height H232 measured at a bottom of the third taper-pipe portion 232 is less than the height H222 measured at a bottom of the second taper-pipe portion 222.

The third straight-pipe portion 231 has a third opening 233 having the height H233 greater than the height H222 measured at a bottom of the second taper-pipe portion 222. A third end-drop pipe 234 is provided to connect a bottom of the third taper-pipe portion 232 of the third filter unit 23, and the height H234 at an axial end of the third end-drop pipe 234 is greater than the height H212 at a bottom of the first taper-pipe portion 212. A bottom of the third end-drop pipe 234 is furnished with a third taper portion 235. A third taper-portion opening 237 is located at the narrower end of the third taper portion 235 is close to the neck portion 12. In another embodiment, the height H234 measured at an axial end of the third end-drop pipe 234 can be less than the height H212 measured at a bottom of the first taper-pipe portion 212 as required.

The fourth filter unit 24 has a fourth straight-pipe portion 241 and a fourth taper-pipe portion 242. An outer diameter of the fourth straight-pipe portion 241 is smaller than an inner diameter of the third straight-pipe portion 231. The fourth filter unit 24, disposed in the third filter unit 23, has the same center axis C as the third filter unit 23. The height H242 measured at a bottom of the fourth taper-pipe portion 242 is less than the height H233 of the third opening 233, but greater than the height H232 measure at a bottom of the third taper-pipe portion 232. A top portion of the fourth straight-pipe portion 241 acts as an exit of the air.

Referring to FIG. 2A and FIG. 2B, flow paths of the air A, the first mist M1 and the second mist M2 inside the particles capturing system 100 are completely disclosed, in which solid-line arrows stand for the air paths, and dashed-line arrows stand for the mist paths.

The air A enters the air intake portion 11 via the air inlet 111, and enters the neck portion 12 after flowing though the adjustment member 14. By having the adjustment gear set 15 to control the vertical movement of the adjustment member 14, the flow speeds of the air passing through the annular cross section of the neck portion 12 and the air entering the neck portion 12 can be adjusted. For example, in one exemplary example, by narrowing the annular cross section of the neck portion 12, the corresponding flow speed of the air A can be increased. In addition, in another exemplary example, by enlarging the annular cross section of the neck portion 12, the corresponding flow speed of the air A can be decreased. Further, by omitting the adjustment gear set 15, the corresponding flow speed of the air A can be constant.

A vacuum fan (not shown in the figure) can be furnished to the top portion of the fourth straight-pipe portion 241, so that the air A can be drawn into the air intake portion 11 via the air inlet 111.

Then, after passing through the porous material 121, the air A keeps flow upward to enter the air outlet portion 13. While the air A is passing the first nozzles 30, the first mist M1 can wash the air A so as to capture the particles in the air A.

Then, the first mist M1 containing the particles would drop into the porous material 121, so that the porous material 121 can perform the sewage degradation and separation treatment upon the first mist M1. After passing through the porous material 121, the first mist M1 keeps falling down into the collection tank 16. Nevertheless, in another exemplary example, the porous material 121 can be omitted.

At the same time, the air A keeps flowing upward to enter the first filter unit 21 via the first opening 213. While the air A is passing the second nozzle 40, the air A is washed for the second time by the second mist M2, such that the particles remained in the air A can be captured by the second mist M2.

Thereupon, the particles in the air A can be blocked from entering the second filter unit 22.

After the second mist M2 carrying the particles passes through the first taper-pipe portion 212, the first end-drop pipe 214, the first taper portion 215 and the first taper-portion opening 217, the second mist M2 is dropped into the porous material 121, so that the porous material 121 can perform another sewage degradation and separation treatment upon the second mist M2. After passing through the porous material 121, the second mist M2 keeps falling into the collection tank 16.

Meanwhile, the air A enters the second filter unit 22 via the bottom of the second taper-pipe portion 222, and then enters the third filter unit 23 via the third opening 233. The particles in the air A would be suffered from the centrifugal and gravity forcing, and thus be discharged through the third taper-portion opening 237. The air A then flows into the fourth filter unit 24 via the bottom of the fourth taper-pipe portion 242. Finally, an air A1 flows out of the cyclone filter device 20 via a top end of the fourth straight-pipe portion 241. In an exemplary example, preferably, the air A1 leaving the fourth straight-pipe portion 241 would be free from the particles.

It shall be explained that, as understood by the skill in the art, operations of the cyclone filter device 20 are described as follow. After the air A enters the cyclone filter device 20, 23, spiral rotations would happen to the air A inside the cyclone filter device 20, 23. With the particles in the air A to go through both the centrifugal force and the gravity force, the particles would be separated from the air A and drop off via the bottom of the cyclone filter device 20. Accordingly, the multi-sleeve telescoping structure provided by this disclosure including the first filter unit 21, the second filter unit 22, the third filter unit 23 and the fourth filter unit 24 can induce a dual spiral filtration pattern upon the air A.

The particles separated spirally from the third filter unit 23 and the fourth filter unit 24 can be led into the first end-drop pipe 214 and the first taper portion 215 via the third end-drop pipe 234 and the third taper-portion opening 237 of the third taper portion 235, and then be discharged through the first taper-portion opening 217. Similarly, the particles separated spirally from the first filter unit 21 and the second filter unit 22 can drop into the first end-drop pipe 214 and the first taper portion 215, and then be discharged through the first taper-portion opening 217. Then, the discharged particles would be led out of the cyclone filter device 20.

FIG. 4 to FIG. 7 demonstrate schematically different exemplary examples for the filter unit of the cyclone filter device in FIG. 1. As shown, the first filter unit 21A has a first straight-pipe portion 211 and a first taper-pipe portion 212, and the third filter unit 23A has a third straight-pipe portion 231 and a third taper-pipe portion 232. In comparison with FIG. 2B, the first filter unit 21A and the third filter unit 23 in FIG. 4 exclude the first end-drop pipe 214, the first taper portion 215, the third end-drop pipe 234 and the third taper portion 235 in FIG. 2B.

Figure 4:
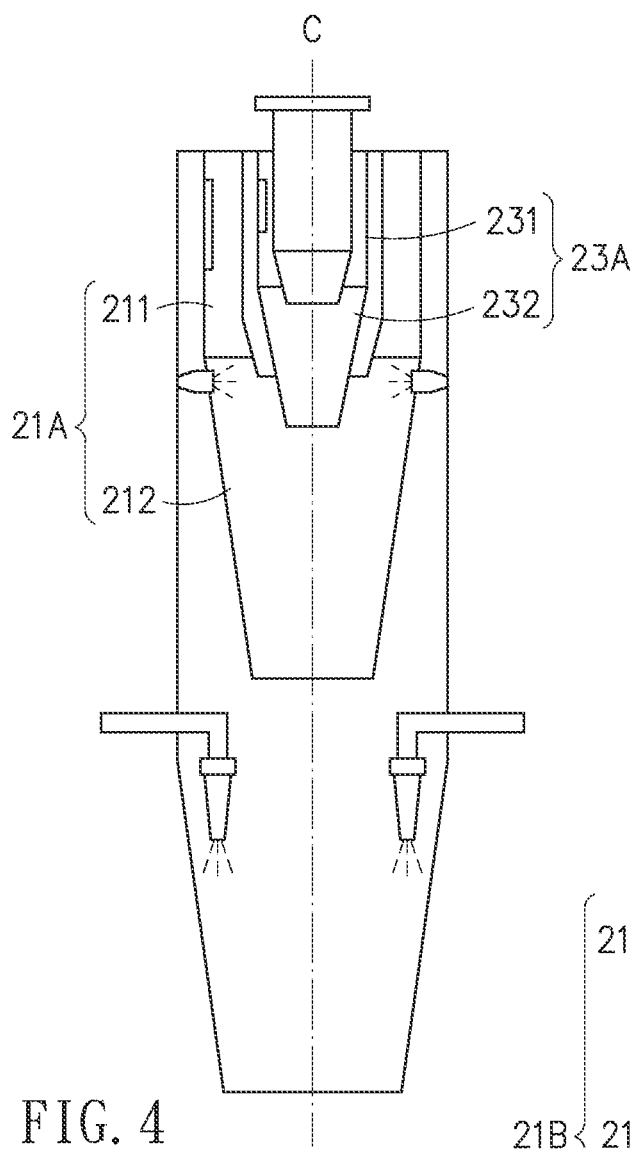
FIG. 4 to FIG. 7 demonstrate schematically different exemplary examples of the filter unit of the cyclone filter device for the embodiment in FIG. 1.
Figure 5:
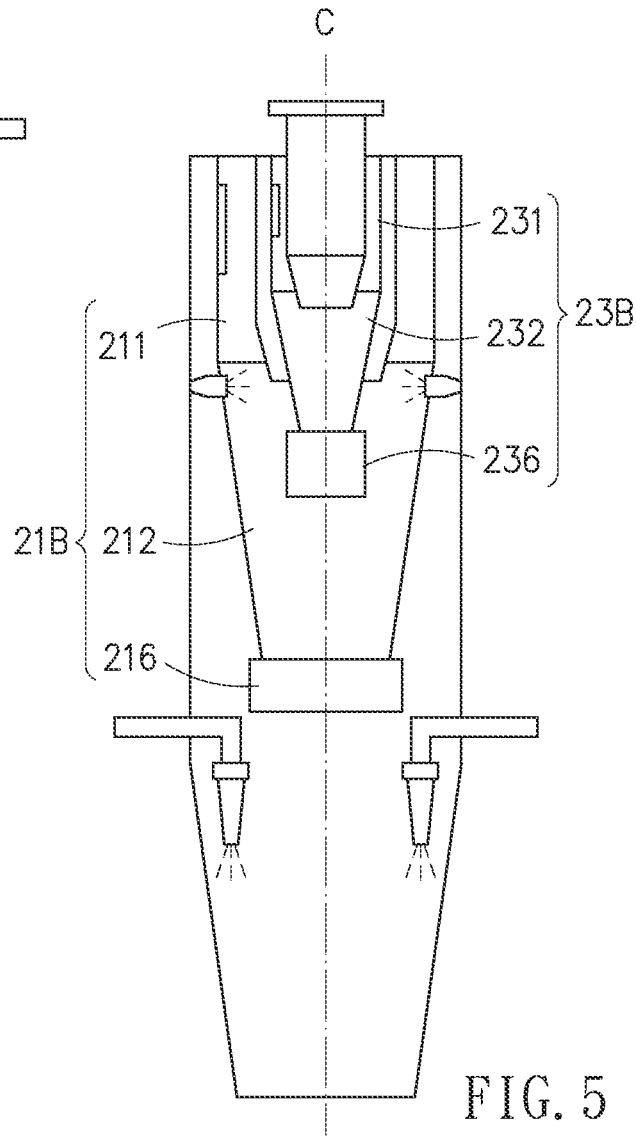

Referring to FIG. 5, this exemplary example is an improvement of FIG. 4. As shown, a first hollow dust collector 216 such as a hollow cylinder is provided to a bottom of the first taper-pipe portion 212 of the first filter unit 21B. In addition, a third hollow dust collector 236 such as a hollow cylinder for collecting the particles in the air is provided to a bottom of the third taper-pipe portion 232 of the third filter unit 23B.

Figure 6:
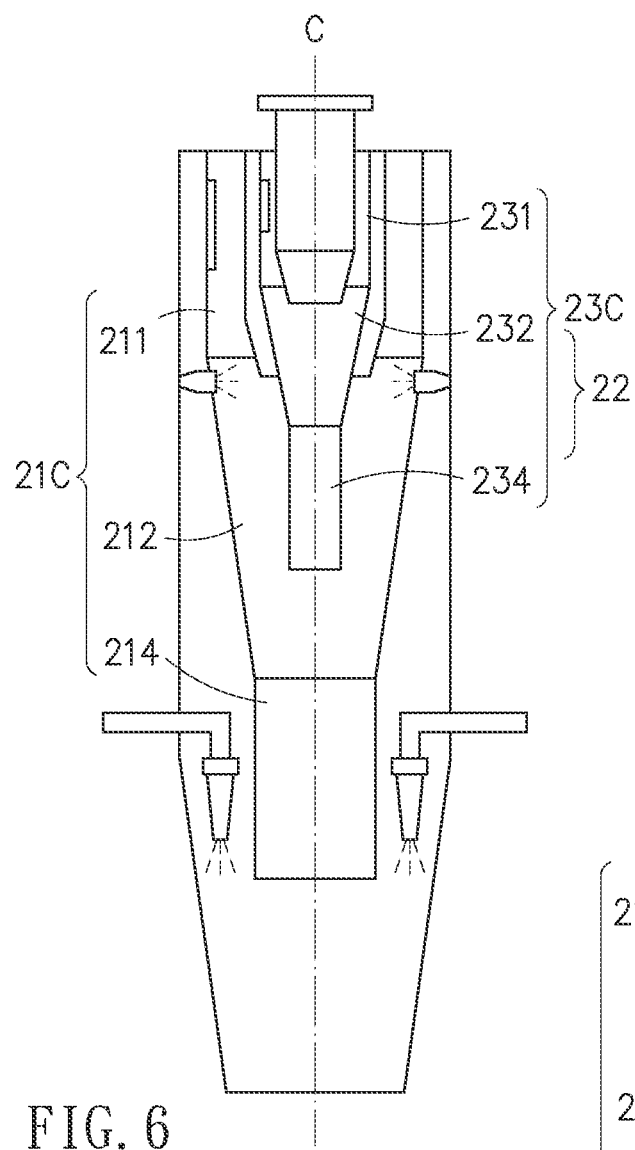

Referring to FIG. 6, the first filter unit 21C has a first straight-pipe portion 211, a first taper-pipe portion 212 and a first end-drop pipe 214, and the third filter unit 23C has a third straight-pipe portion 231, a third taper-pipe portion 232 and a third end-drop pipe 234. In comparison with FIG. 2B, the first filter unit 21C and the third filter unit 23C do not include the first taper portion 215 and the third taper portion 235 in FIG. 2B.

Figure 7:
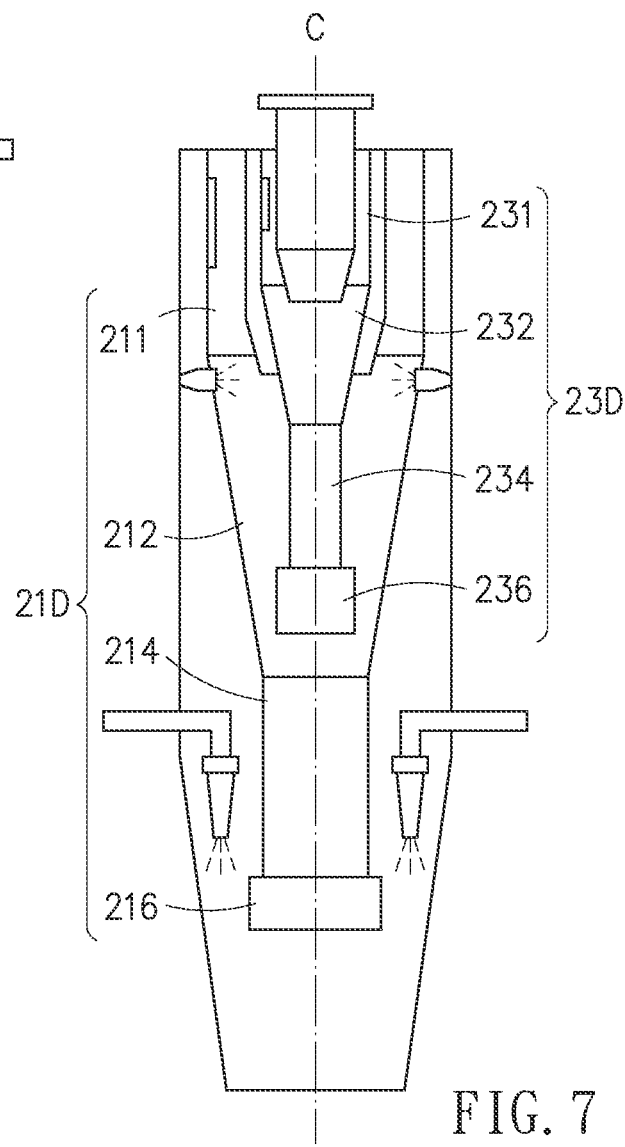

Referring to FIG. 7, an improvement of FIG. 6 is schematically shown. In this exemplary example, a bottom of the first end-drop pipe 214 of the first filter unit 21D is furnished with a first hollow dust collector 216 such as a hollow cylinder, and a bottom of the third end-drop pipe 234 of the third filter unit 23D is furnished with a third hollow dust collector 236 such as a hollow cylinder for collecting the particles in the air.

As shown in FIG. 4 through FIG. 7, beside the filter unit of this disclosure has the straight-pipe portion and the taper-pipe portion, the taper portion, the end-drop pipe and the hollow dust collector are included per different requirements.

Figure 8:
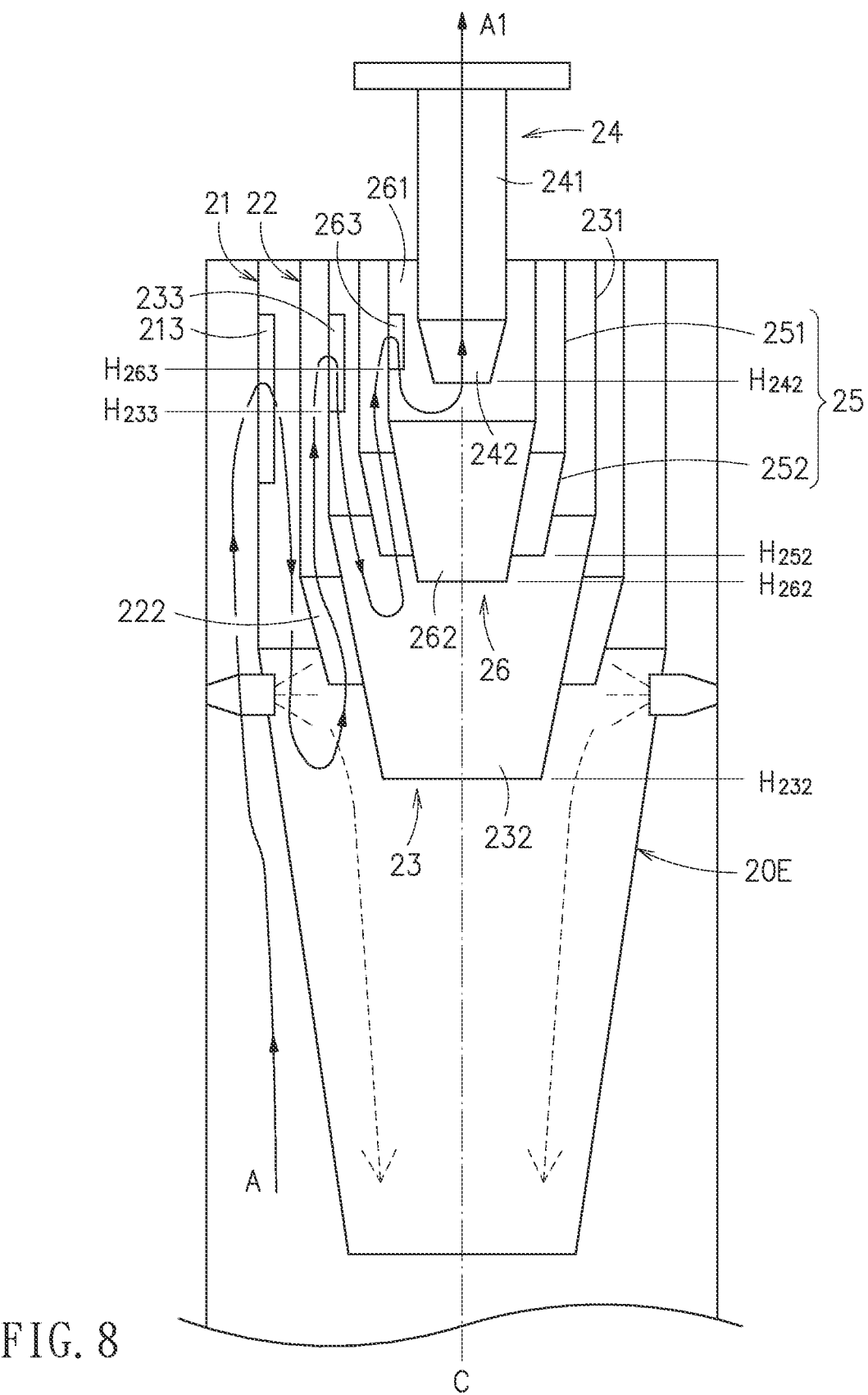
FIG. 8 to FIG. 10 demonstrate schematically different exemplary examples of the cyclone filter device in accordance with this embodiment.

Referring to FIG. 8, the cyclone filter device 20E is an improvement of FIG. 2A. As shown, a fifth filter unit 25 and a sixth filter unit 26 are further included between the third filter unit 23 and the fourth filter unit 24.

The fifth filter unit 25 has a fifth straight-pipe portion 251 and a fifth taper-pipe portion 252, and an outer diameter of the fifth straight-pipe portion 251 is smaller than an inner diameter of the third straight-pipe portion 231. The fifth filter unit 25 is disposed inside the third filter unit 23, and keeps the same center axis C. The height H252 measured at a bottom of the fifth taper-pipe portion 252 is less than the height H233 of the third opening 233, but greater than the height H232 measured at a bottom of the third taper-pipe portion 232.

The sixth filter unit 26 has a sixth straight-pipe portion 261 and a sixth taper-pipe portion 262, and an outer diameter of the sixth straight-pipe portion 261 is smaller than an inner diameter of the fifth straight-pipe portion 251. The sixth filter unit 26 is disposed inside the fifth filter unit 25, and keeps the same center axis C. The height H262 measured at a bottom of the sixth taper-pipe portion 262 is less than the height H252 measured at a bottom of the fifth taper-pipe portion 252. The sixth straight-pipe portion 261 is furnished with a sixth opening 263, and the height H263 of the sixth opening 263 is greater than the height H242 measured at a bottom of the fourth taper-pipe portion 242.

The fourth filter unit 24 is disposed inside the sixth filter unit 26, and keeps the same center axis C. A top of the fourth straight-pipe portion 241 is an exit of the air A1.

As shown in FIG. 8, the air A enters the first filter unit 21 via the first opening 213, then enters the second filter unit 22 via a bottom of the second taper-pipe portion 222, then enters the third filter unit 23 via the third opening 233, then enters the fifth filter unit 25 via a bottom of the fifth taper-pipe portion 252, then enters the sixth filter unit 26 via the sixth opening 263, then enters the fourth filter unit 24 via a bottom of the fourth taper-pipe portion 242, and finally leaves the cyclone filter device 20E via a top of the fourth straight-pipe portion 241 as the air A1.

Figure 9:
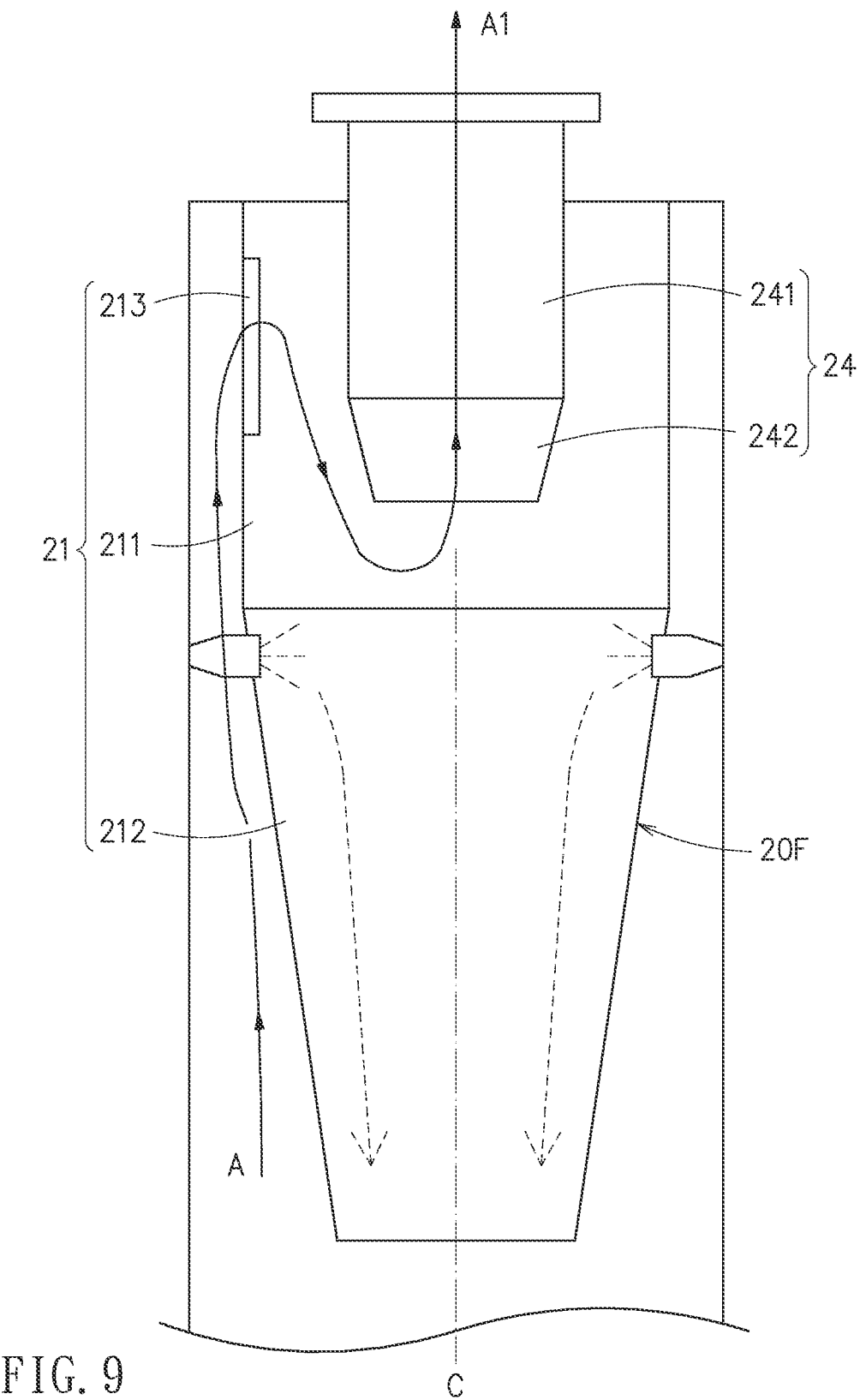

Referring to FIG. 9, the cyclone filter device 20F, as an improvement of FIG. 2A, simply has a first filter unit 21 and a fourth filter unit 24.

The first filter unit 21 has a first straight-pipe portion 211 and a first taper-pipe portion 212. The first straight-pipe portion 211 is furnished with a first opening 213 as an entrance. The fourth filter unit 24 has a fourth straight-pipe portion 241 and a fourth taper-pipe portion 242. A top of the fourth straight-pipe portion 241 is an exit for the air A1.

As shown in FIG. 9, the air A enters the first filter unit 21 via the first opening 213, then enters the fourth filter unit 24 via a bottom of the fourth taper-pipe portion 242, and finally leaves the cyclone filter device 20F via a top of the fourth straight-pipe portion 241 as the air A1.

Figures 10, 10A:
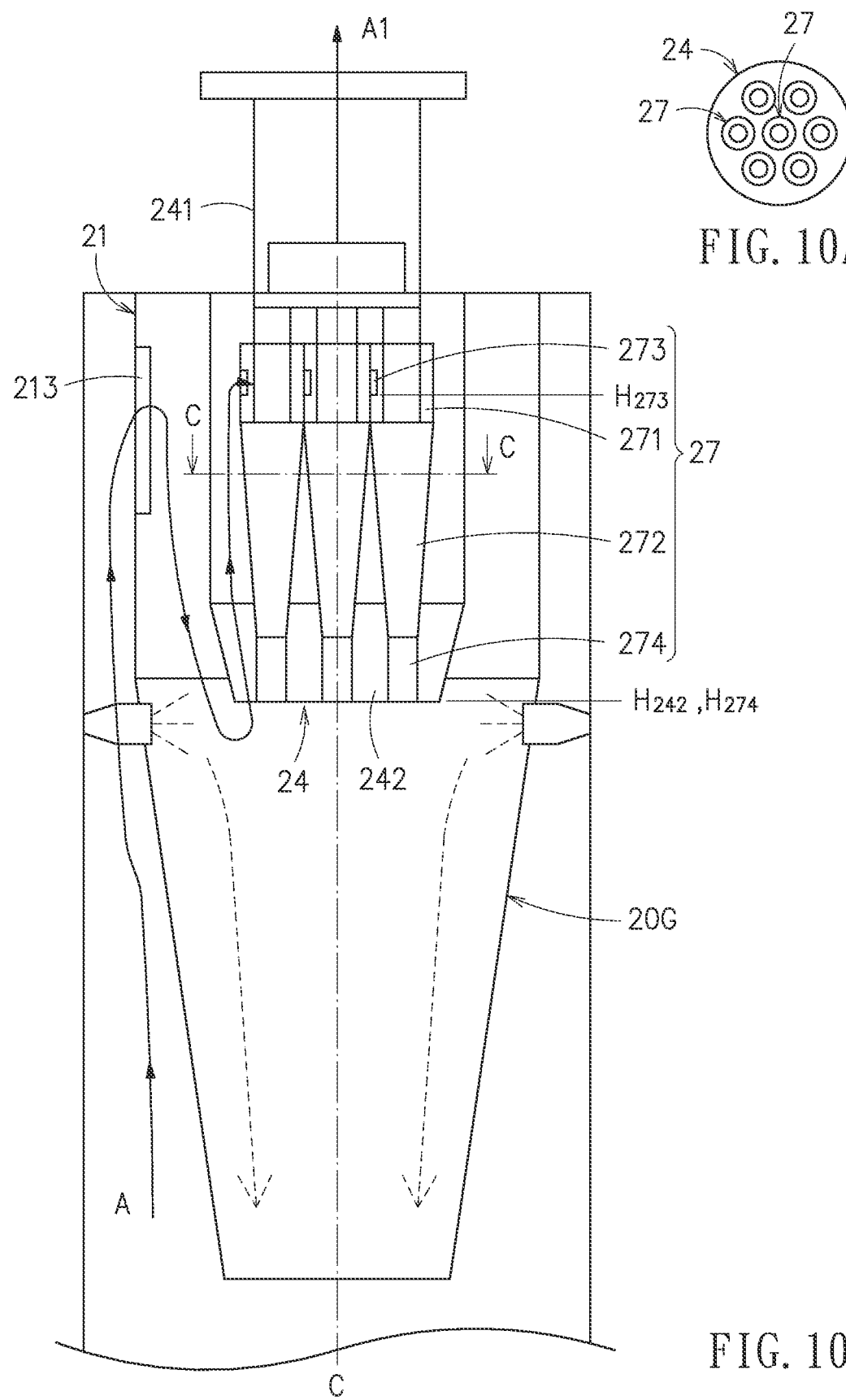
FIG. 10A is a schematic cross-sectional view of FIG. 10 along line C-C.

Referring to FIG. 10, the cyclone filter device 20G is an improvement of FIG. 9. In this embodiment, the innermost fourth filter unit 24 is furnished thereinside with a plurality of sub-filter units 27, and each of the sub-filter units 27 has a sub-straight pipe portion 271, a sub-taper pipe portion 272 and a sub end-drop pipe 274. An outer diameter of the sub-straight pipe portion 271 is smaller than an inner diameter of the innermost fourth filter unit 24. Each of the sub-straight pipe portions 271 is furnished with a sub-opening 273 having the height H273 greater than the height H242 measured at a bottom of the fourth taper-pipe portion 242 of the innermost fourth filter unit 24. Tops of the individual sub-filter units 27 are all connected together, and also connected with the fourth straight-pipe portion 241 of the fourth filter unit 24. The height H274 measured at a bottom of the sub end-drop pipe 274 is substantially equal to or less than the height H242 measured at a bottom of the fourth taper-pipe portion 242 of the innermost fourth filter unit 24.

Referring to FIG. 10 and FIG. 10A, in this embodiment, the innermost fourth filter unit 24 further includes thereinside a plurality of sub-filter units 27, in which one sub-filter unit 27 is disposed along the center axis C while the other sub-filter units 27 are evenly arranged around the center axis C (i.e., the center sub-filter unit 27) by equal-angle spacing.

In the exemplary example of FIG. 10, the air A enters the first filter unit 21 via the first opening 213, then enters the fourth filter unit 24 via the bottom of the fourth taper-pipe portion 242, then enters each of the sub-filter units 27 via the corresponding sub-openings 273, and finally leaves the cyclone filter device 20G via the clustered tops of the fourth straight-pipe portions 241. In this exemplary example, the air undergoes a flow pattern of spiral vortex to flow along walls of the pipe structure, such that the particles in the air can be separated and thus be captured thereafter. In another exemplary example, before the air enters the second cyclone filter device via the entrance, an additional second mist can be provided for inhibiting the particles in the air to enter the second filtration structure. By having the second mist to wash the air, the particles in the air can be captured and then drop down with the water into the collection tank located beneath. As such, the particles in the air would pass multiple filter units arranged in a telescopic manner for producing spiral flows, and thus multiple particle-capturing mechanisms can be setup to capture the particles in the passing air flow.

The common feature of the cyclone filter devices shown in FIG. 2B and FIG. 8 through FIG. 10 is that: each of the filter units includes a straight-pipe portion and a taper-pipe portion, the center axis of the straight-pipe portion is perpendicular to the base plane, the narrower end (i.e., the tip) of the taper-pipe portion is close to the neck portion, the outmost filter unit has an entrance having the height greater than the height measured at a bottom of the neighboring innermost filter unit, and the top end of the straight-pipe portion of the innermost filter unit is the exit of the air having the height greater than the height of the entrance of the air. In an exemplary example, the entrance of the outmost filter unit can be located right at the center axis of the device, or laterally to the device.

It shall be explained that, in the aforesaid embodiments and examples, the height Hx is defined to be the shortest distance with respect to the base plane H. In other words, if the particles capturing system 100 of FIG. 1 is turned by a right angle (90°) to have the center axis C parallel to the base plane H, then the aforesaid height Hx may be measured from another reference such as the air inlet 111.

In summary, in the particles capturing system provided by this disclosure, the venturi filter device integrates the cyclone filter device and the two sections of mists.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A particles capturing system, comprising:
   a venturi filter device, having an air intake portion, a neck portion and an air outlet portion, a height of the air outlet portion being greater than another height of the air intake portion, the neck portion being disposed between the air intake portion and the air outlet portion, an inner diameter of the neck portion being smaller than another inner diameter of any of the air intake portion and the air outlet portion, defined with a center axis;
   a cyclone filter device, disposed along the center axis in the air outlet portion, having a plurality of filter units, each of the plurality of filter units including a straight-pipe portion and a taper-pipe portion connected with a bottom of the straight-pipe portion, the straight-pipe portion having another center axis perpendicular to a base plane, a narrower end of the taper-pipe portion being close to the neck portion, the straight-pipe portions of the plurality of filter units having at least two sizes, the plurality of filter units being telescoped together, the outmost filter unit of the plurality of filter units including an entrance having a height greater than another height measured at a bottom of the neighboring innermost filter unit of the plurality of filter units, the straight-pipe portion of the innermost filter unit having an exit located at a top thereof, the exit having a height greater than another height of the entrance; and
   a plurality of first nozzles, disposed inside the venturi filter device, having a height greater than another height of the neck portion, each of the plurality of first nozzles providing a first mist, a spray direction of the first mist being parallel to the center axis of the venturi filter device, the plurality of first nozzles being to spray toward the neck portion.

2. The particles capturing system of claim 1, wherein the venturi filter device further includes an adjustment member, the adjustment member has a taper portion, a narrower end of the taper portion is close to the neck portion, and the adjustment member is vertically movably disposed in the air intake portion to adjust a flow speed of the air to pass the neck portion from the air intake portion.

3. The particles capturing system of claim 2, wherein the adjustment member is connected with an adjustment gear set, and the adjustment gear set includes:
   a first gear assembly, including a first gear and a first shaft, two opposite ends of the first shaft being connected with the adjustment member and the first gear, respectively, the first shaft having an axial direction perpendicular to the base plane; and a second gear assembly, including a second gear and a second shaft, one end of the second shaft being connected with the second gear while another end thereof protrudes out of the venturi filter device, the second gear being meshed with the first gear, the second shaft being driven to synchronously move the second gear to rotate the first gear and further to drive the first shaft to lift the adjustment member vertically.

4. The particles capturing system of claim 1, further including a collection tank under the air inlet for collecting the falling first mists.

5. The particles capturing system of claim 4, wherein the air inlet is disposed laterally to the air intake portion and above the collection tank, and the air enters the air intake portion in a direction parallel to the base plane.

6. The particles capturing system of claim 4, wherein the air inlet is disposed at a bottom of the air intake portion, the air inlet is connected with an air-inlet extension pipe protruding out of the collection tank, and the air enters the air intake portion in a direction perpendicular to the base plane.

7. The particles capturing system of claim 6, further including a pipe-end deflector disposed above the air-inlet extension pipe by a predetermined gap; wherein, when the air flows out of the air-inlet extension pipe and enters the air intake portion, the pipe-end deflector bifurcates the air and further deflects the air outward.

8. The particles capturing system of claim 1, wherein the neck portion of the venturi filter device is furnished thereinside with a porous material.

9. The particles capturing system of claim 1, wherein the cyclone filter device includes:
  a first filter unit, having a first straight-pipe portion and a first taper-pipe portion, the first straight-pipe portion being furnished with a first opening as the entrance;
  a second filter unit, having a second straight-pipe portion and a second taper-pipe portion, the second straight-pipe portion having an outer diameter less than an inner diameter of the first straight-pipe portion, the second filter unit being disposed inside the first filter unit but keeping the same center axis, a height measured at a bottom of the second taper-pipe portion being less than another height of the first opening;
  a third filter unit, having a third straight-pipe portion and a third taper-pipe portion, the third straight-pipe portion having an outer diameter less than an inner diameter of the second straight-pipe portion, the third filter unit being disposed inside the second filter unit but keeping the same center axis, a height measured at a bottom of the third taper-pipe portion being less than the height measured at the bottom of the second taper-pipe portion, the third straight-pipe portion being furnished with a third opening, a height of the third opening being greater than the height measured at the bottom of the second taper-pipe portion; and
  a fourth filter unit, having a fourth straight-pipe portion and a fourth taper-pipe portion, the fourth straight-pipe portion having an outer diameter less than an inner diameter of the third straight-pipe portion, the fourth filter unit being disposed inside the third filter unit but keeping the same center axis, a height measured at a bottom of the fourth taper-pipe portion being less than the height of the third opening but greater than the height measured at the bottom of the third taper-pipe portion, the fourth straight-pipe portion having a top as the exit.

10. The particles capturing system of claim 9, wherein a bottom of the first taper-pipe portion of the first filter unit is furnished with a first hollow dust collector.

11. The particles capturing system of claim 9, wherein a bottom of the first taper-pipe portion of the first filter unit is furnished with a first end-drop pipe, and a height of an axial bottom of the first end-drop pipe is less than another height of each of the plurality of first nozzles.

12. The particles capturing system of claim 11, wherein the axial bottom of the first end-drop pipe has a first taper portion, and a narrower opening of the first taper portion faces the neck portion.

13. The particles capturing system of claim 11, wherein the axial bottom of the first end-drop pipe is furnished with a first hollow dust collector.

14. The particles capturing system of claim 9, wherein a bottom of the third taper-pipe portion of the third filter unit is furnished with a third hollow dust collector.

15. The particles capturing system of claim 9, wherein a bottom of the third taper-pipe portion of the third filter unit is furnished with a third end-drop pipe, and a height measured at an axial bottom of the third end-drop pipe is greater than another height measured at a bottom of the first taper-pipe portion.

16. The particles capturing system of claim 15, wherein the axial bottom of the third end-drop pipe is furnished with a third taper portion, and a narrower opening of the third taper portion faces the neck portion.

17. The particles capturing system of claim 15, wherein the axial bottom of the third end-drop pipe is furnished with a third hollow dust collector.

18. The particles capturing system of claim 9, between the third filter unit and the fourth filter unit, further including:
  a fifth filter unit, having a fifth straight-pipe portion and a fifth taper-pipe portion, the fifth straight-pipe portion having an outer diameter less than an inner diameter of the third straight-pipe portion, the fifth filter unit being disposed inside the third filter unit but keeping the same center axis, a height measured at a bottom of the fifth taper-pipe portion being less than the height of the third opening but greater than the height measured at the bottom of the third taper-pipe portion; and
  a sixth filter unit, having a sixth straight-pipe portion and a sixth taper-pipe portion, the sixth straight-pipe portion having an outer diameter less than an inner diameter of the fifth straight-pipe portion, the sixth filter unit being disposed inside the fifth filter unit but keeping the same center axis, a height measured at a bottom of the sixth taper-pipe portion being less than the height measured at the bottom of the fifth taper-pipe portion, the sixth straight-pipe portion being furnished with a sixth opening, the sixth opening having a height greater than the height measured at the bottom of the fifth taper-pipe portion;
  wherein the fourth filter unit is disposed inside the sixth filter unit but keeps the same center axis, a height measured at a bottom of the fourth straight-pipe portion is less than a height of the sixth opening but greater than the height measured at the bottom of the sixth taper-pipe portion, and the fourth straight-pipe portion has a top as the exit.

19. The particles capturing system of claim 1, wherein the innermost filter unit of the plurality of filter units is furnished thereinside a plurality of sub-filter units, each of the plurality of sub-filter units has a sub-straight pipe portion, a sub-taper pipe portion and a sub end-drop pipe, the sub-straight pipe portion has an outer diameter less than an inner diameter of the innermost filter unit, a height measured at a bottom of the sub-taper pipe portion connecting the sub end-drop pipe located therebelow is substantially equal to or less than another height measured at a bottom of the taper-pipe portion of the innermost filter unit, the sub-straight pipe portion is furnished with a sub-opening having a height greater than the bottom of the taper-pipe portion of the innermost filter unit, and tops of the plurality of sub-filter units are connected together and also connected with the straight-pipe portion of the innermost filter unit.

20. The particles capturing system of claim 1, wherein the plurality of first nozzles have the same height, and evenly arranged to surround the center axis of the venturi filter device by equal angular spacing.

21. The particles capturing system of claim 1, further including a plurality of second nozzles disposed inside the venturi filter device by closing to the air outlet portion and by surrounding the cyclone filter device, wherein each of the plurality of second nozzles has a height greater than another height of any of the plurality of first nozzles, each of the plurality of second nozzles provides a second mist having a spray direction substantially parallel to the base plane or perpendicular to the base plane by facing downward to spray into the cyclone filter device from the second nozzle;

wherein, when the air is introduced, the air enters the venturi filter device via the air inlet of the air intake portion, then passes orderly through the neck portion and the plurality of first nozzles, then enters the cyclone filter device via the entrance, then passes through the plurality of second nozzles, and finally leaves the cyclone filter device via the exit, such that particles in the air can be captured.

22. The particles capturing system of claim 21, wherein the plurality of second nozzles have the same height, and are evenly arranged to surround the center axis of the cyclone filter device by equal angular spacing.

23. The particles capturing system of claim 21, wherein a collection tank is disposed under the air inlet for collecting the falling second mist.

* * * * *